(12) United States Patent
Aihara et al.

(10) Patent No.: US 7,171,317 B2
(45) Date of Patent: Jan. 30, 2007

(54) LOAD INFORMATION DISPLAY DEVICE AND CIRCUIT BREAKER

(75) Inventors: Kazuya Aihara, Nakajo (JP); Kazuhiko Kato, Shibata (JP); Hideki Hayakawa, Nakajo (JP); Tetsunori Watanabe, Niigata (JP); Toshiko Kimura, Toyosaka (JP)

(73) Assignee: Hitachi Industrial Equipment Systems Co., Ltd., Chiba (JP)

( * ) Notice: Subject to any disclaimer, the term of this patent is extended or adjusted under 35 U.S.C. 154(b) by 10 days.

(21) Appl. No.: 11/062,823

(22) Filed: Feb. 23, 2005

(65) Prior Publication Data

US 2006/0085148 A1    Apr. 20, 2006

(30) Foreign Application Priority Data

Oct. 1, 2004    (JP)    ............................. 2004-289527

(51) Int. Cl.
*G01R 31/08* (2006.01)
*G01R 21/00* (2006.01)

(52) U.S. Cl. ...................... 702/62; 702/58; 702/188; 324/424; 324/114; 340/638

(58) Field of Classification Search ............ 702/57–59, 702/60–62, 64, 65, 187, 188; 324/424, 140 R, 324/141, 142, 114; 340/637, 638, 639, 646
See application file for complete search history.

(56) References Cited

U.S. PATENT DOCUMENTS

| | | | |
|---|---|---|---|
| 5,553,094 A * | 9/1996 | Johnson et al. | ............. 375/130 |
| 2001/0000355 A1* | 4/2001 | Santos et al. | ................. 702/58 |
| 2003/0009301 A1* | 1/2003 | Anand et al. | ................. 702/62 |
| 2003/0165142 A1* | 9/2003 | Mills et al. | ............ 370/395.62 |

FOREIGN PATENT DOCUMENTS

JP    2002-095152    3/2002

* cited by examiner

*Primary Examiner*—Carol S. W. Tsai
*Assistant Examiner*—Manuel L Barbee
(74) *Attorney, Agent, or Firm*—Antonelli, Terry, Stout and Kraus, LLP.

(57) ABSTRACT

This invention is intended to reduce the cost by displaying the load information of a plurality of circuits with a single display device and transferring one of the two communication units in the measuring instruments from the measuring instruments to the display device to acquire the load information of a plurality of circuits. The display device and the measuring instruments are separated from each other, and the display device includes a plurality of communications units connectable with a plurality of devices, while each of many measuring instruments includes a single communication unit.

7 Claims, 3 Drawing Sheets

FIG.5A
FIG.5B
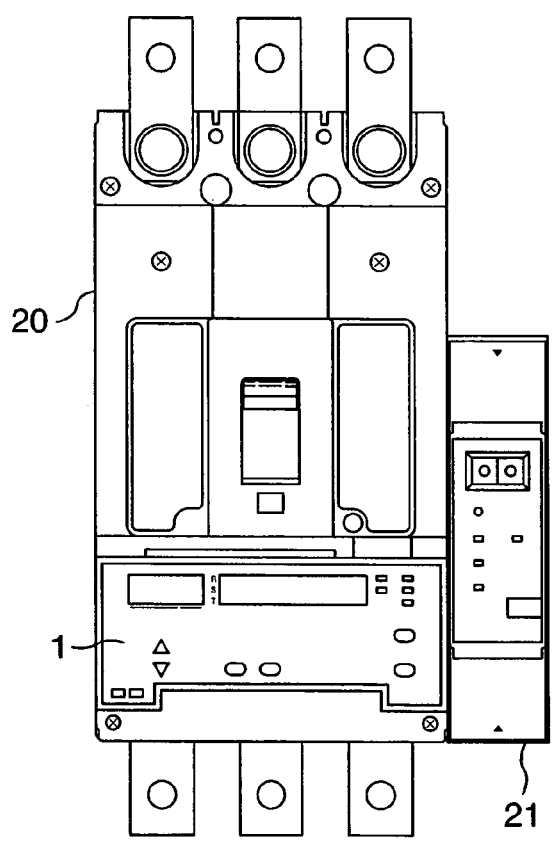
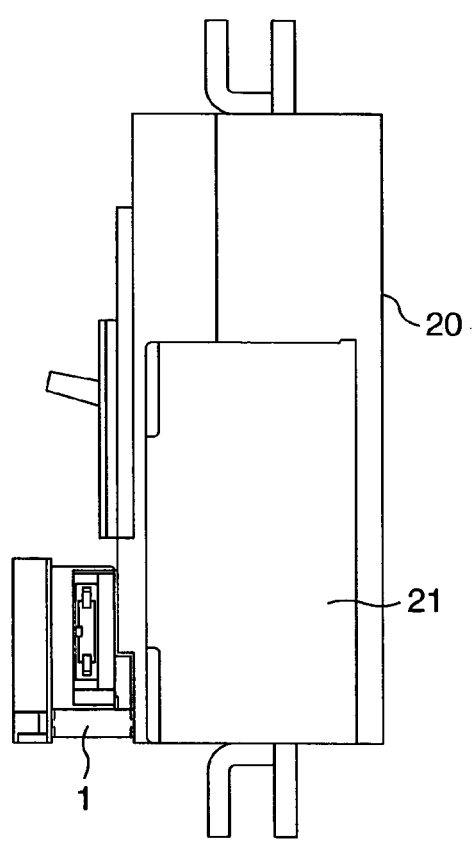

LOAD INFORMATION DISPLAY DEVICE AND CIRCUIT BREAKER

INCORPORATION BY REFERENCE

The present application claims priority from Japanese application JP2004-289527 filed on Oct. 1, 2004, the content of which is hereby incorporated by reference into this application.

BACKGROUND OF THE INVENTION

The present invention relates to a display device used to display and transmit the load information of a plurality of circuits and a circuit breaker having the functions of measuring, displaying and transmitting the load information of a single circuit.

In the prior art, JP-A-2002-95152 discloses a circuit breaker which includes a current detection means and a voltage detection means built therein and which, having the functions to calculate and transmit the load information of an electrical circuit, is connected with a display device as required.

The circuit breaker disclosed in JP-A-2002-95152, which presupposes the central management of the load information using a personal computer, employs a method of connecting the display device as required. In this method, the communication means such as RS-232C or an infrared ray is used, and therefore the load information of only the measuring instrument connected is displayed.

Also, the provision of two communication circuits with the measuring instruments to display the load information increases the number of normally-unused extraneous communication means with the increase in measurement points, thereby posing a stumbling block to cost reduction.

SUMMARY OF THE INVENTION

This invention is intended to obviate the problem described above and the object thereof is to provide a load information display device for displaying and transmitting the load information of a plurality of measuring instruments.

In order to achieve the object of the invention, according to the invention, there is provided a load information display device and a circuit breaker, (1) wherein the device function is divided into the function of measuring, the function of displaying and the function of recording the load information, (2) wherein the display device has digital signal communication means capable of connecting a plurality of devices of two types, and one of the communication means is connected with a personal computer and used to record the load information, while the other communication means is connected with the measuring instruments and used to acquire the load information, the digital signal communication means of two types being separated from each other by the display device, (3) wherein the display device periodically requests the circuit load information from a plurality of measuring instruments connected by the digital signal communication means, and the load information thus acquired are stored by being overwritten in an exclusive area of the RAM built in the display device, which information is used as display information for the display device, (4) wherein the load information stored in the exclusive RAM is read from the exclusive area by key operation of the user and displayed on a display unit, (5) wherein the display device, upon receipt of a recording data request from the personal computer connected with the first communication means, issues a request for the recording data to the measuring instruments from the second communication means, and (6) wherein the load information acquired from the measuring instruments through the display device is tabulated in the personal computer and used as information for a daily report, a monthly report or the like.

The present invention produces the following effects:

(1) Extraneous communication means are eliminated from the measuring instruments to reduce the cost of the system as a whole.

(2) The display device and the measuring instruments are connected to each other through a digital signal communication means capable of connecting a plurality of devices, and the load information of a plurality of circuits can be displayed on a single display device. Thus, the circuit load information can be acquired economically.

(3) The communication means of two types are separated from each other by the display device, so that the same communication protocol can be employed for communication between the personal computer and the display device and between the display device and the measuring instruments, thereby making it possible to share the measuring instruments.

(4) The display device, upon receipt of a recording data request from the personal computer, issues the same request again to the measuring instruments. The response information from the measuring instruments are returned as a response to the personal computer by the display device. In this way, the information acquired by the measuring instruments can be transmitted as a response to the personal computer without recognition, on the part of the measuring instruments, of the difference of the request method due to, for example, the difference of software version of the personal computer (the communication process of the display device can be simplified).

Other objects, features and advantages of the invention will become apparent from the following description of the embodiments of the invention taken in conjunction with the accompanying drawings.

BRIEF DESCRIPTION OF THE DRAWINGS

FIGS. 5A and 5B show the appearance of a circuit breaker having the measurement and transmission functions connected with the display device according to the invention.

DETAILED DESCRIPTION OF THE EMBODIMENTS

Embodiments of the invention are described below with reference to the drawings.

[Embodiment 1]

Figure 1:
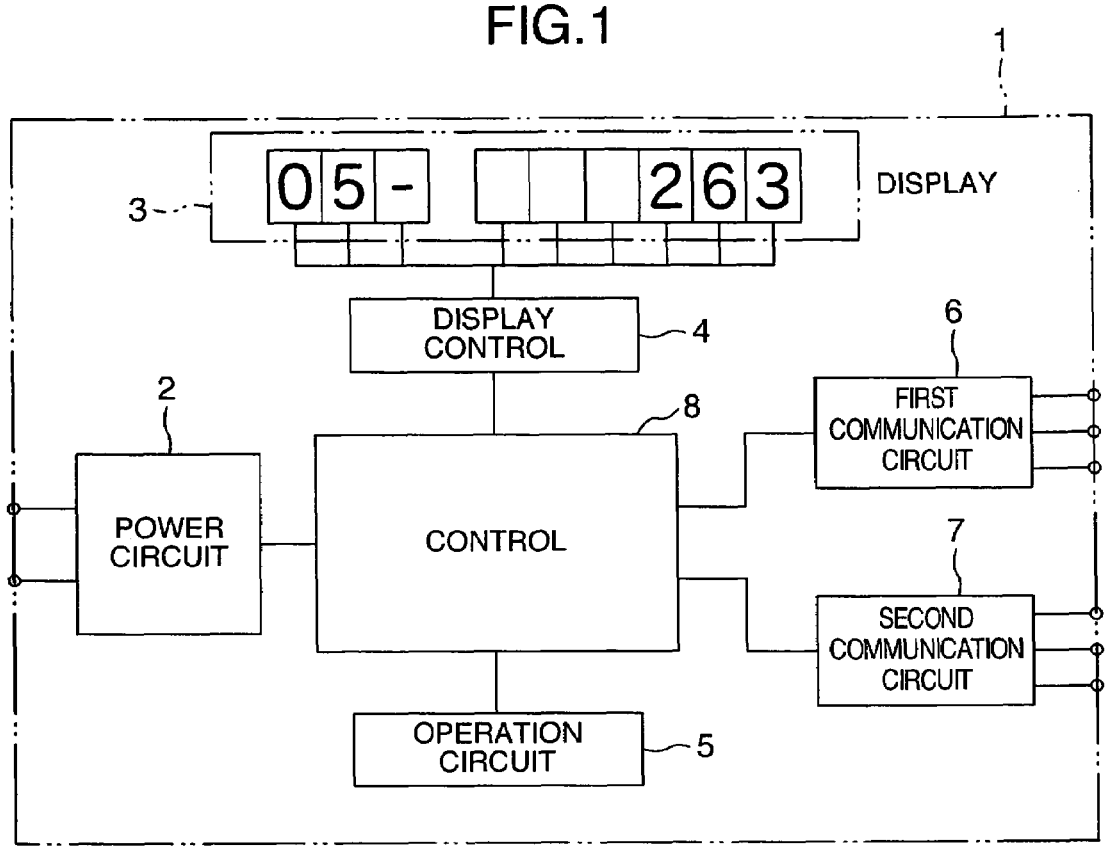
FIG. 1 is a diagram showing a block configuration according to a first embodiment.

FIG. 1 is a diagram showing a block configuration of a load information display device according to a first embodiment of the invention.

The display device 1 according to the invention comprises a power circuit 2 (such as an AC/DC converter or a DC/AC converter) for converting a voltage of AC 100 V to 200 V or DC 110 V supplied thereto into a drive power for internal electronic parts, a display unit 3 (such as a 7-segment LED or liquid crystal) for displaying the load information measured by the measuring instruments connected through a transmission line, a display control unit 4 (such as a display control IC) for controlling the display unit 3, an operation unit 5 (such as a push button switch) used by the person confirming the display to switch the item of display, the circuit or the phase, a first communication circuit 6 (connectable to a plurality of devices configured of RS-485, for example) for transmitting the load information to a personal computer to record or centrally manage the load information, a second communication circuit 7 (connectable to a plurality of devices configured of RS-485, for example) for acquiring the information measured by the measuring instruments, and a control unit 8 for controlling all of the operations of display, operation and communication.

First, immediately after power is switched on, the display device requests the response as to the type of the measuring instruments from all the addresses permitted to set to recognize the number and types of the measuring instruments connected to the display device as an initialization routine (recognition of the addresses and the number of connections).

In response to the request of the display device, each measuring instrument connected to the second communication network, upon receipt of the request addressed to the particular measuring instrument, transmits the type code (unit code) of the particular measuring instrument. The display device according to the invention determines whether the response from the particular measuring instrument is the one to the request made by the display apparatus, and if so, registers the address and the device type (unit code) contained in the response in the RAM of the control unit 8. This process is executed for all the addresses permitted to set thereby to recognize the number and types of the measuring instruments connected to the second communication circuit network.

Next, the display device 1, in order to display the load information on the display unit 3, requests the transmission of the load information from each measuring instrument connected to the second communication circuit network through the second communication circuit 7. This load information transmission request is made only to the connected addresses and by a method most suitable for the connected measuring instruments based on the information acquired earlier by recognition of the addresses and the number of connections. The load information is acquired basically in the ascending order of address of which the connection is confirmed.

The measuring instrument having received the load information transmission request to its set address transmits the requested measurement value to the second communication network as a response to the display device.

The display device according to the invention determines whether the response data is the requested one, and if so, stores the response data in an exclusive area carrying the address name of which connection is confirmed on the RAM of the control unit 8.

Each measuring instrument that has received the load information transmission request determines whether the request is addressed to the particular measuring instrument, and if so, transmits the requested load information (the whole measurement load information, for example) to the second communication network.

The measuring instrument according to the invention determines whether the signal thus transmitted is a response to the request of its own, and if so, stores the response in the RAM of the control unit 8 through the second communication circuit.

This process is executed for all the addresses of which connection is confirmed, so that the measurement information of the connected measuring instruments are acquired and stored in corresponding exclusive areas.

Upon complete acquisition of the load information up to the maximum address of which connection is confirmed, the process is returned again to the minimum address to execute the load information acquisition process.

Next, to display the load information, the load information data of a selected item for the measuring instrument selected by the user is read from the RAM of the control unit 8 and displayed on the display unit 3 through the display control unit 4. In the case where no display item is selected by the user, the load information of the last selected item is updated to the new information periodically obtained by the measuring instruments.

Now, the connection with the personal computer to record and centrally manage the load information is explained.

Figure 2:
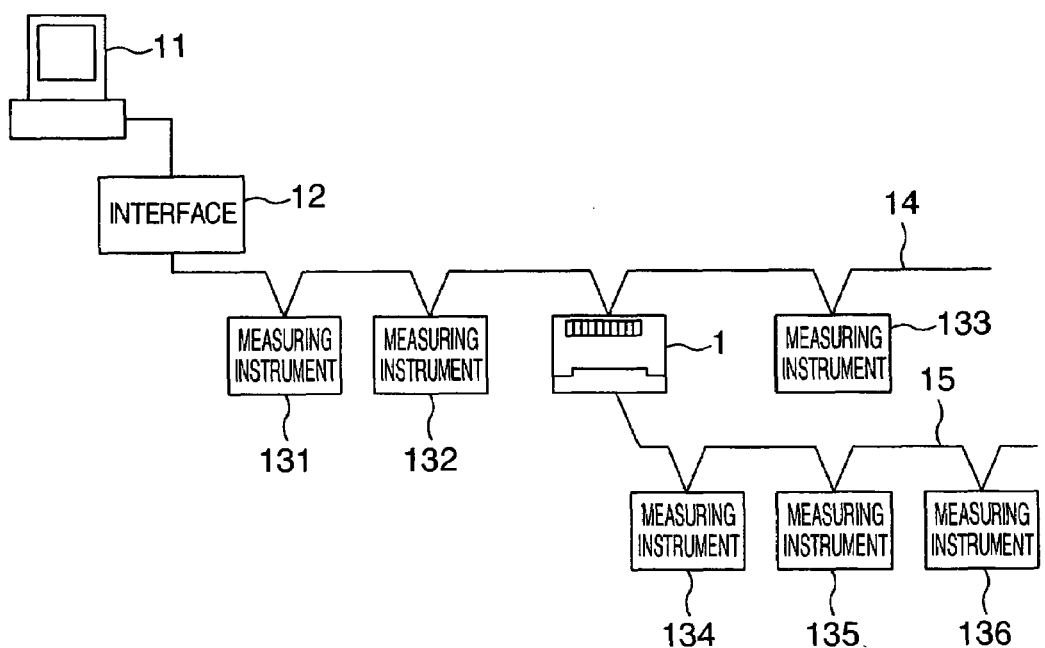
FIG. 2 is a system diagram according to the first embodiment.

FIG. 2 is a diagram showing a system according to the first embodiment of the invention.

The load information measured in the measuring instruments 131 to 136 are recorded and centrally managed by the recording and tabulation software Installed In the personal computer 11 constituting a central processing unit. Numeral 12 designates an interface unit to establish an interface between the personal computer 11 and a communication circuit network 14 making possible the connection with a plurality of devices such as RS-458.

The display device 1 according to this invention is arranged to display the load information of the measuring instruments connected to the communication circuit network 15 on the one hand and to establish an interface between the communication circuit network 14 and the communication circuit network 15 on the other hand.

Normally, the display device 1 according to the invention acquires and displays the load information of the measuring instruments 134 to 136 connected to the communication circuit network 15 as described above. Also, the personal computer 11, which records and centrally manages the load information, acquires, records and manages, at regular time intervals of, say, 10 minutes, 30 minutes or one hour, the load information of the measuring instruments connected to the communication circuit network 14 for the interface device 12 and subsequent devices and the load information of the measuring instruments connected to the communication circuit network 15 including and subsequent to the display device according to the invention.

First, the user registers the addresses and types of the measuring instruments 131 to 136 connected to the communication circuit networks 14, 15, using the personal computer 11. After that, the personal computer 11 requests the load information periodically from the registered addresses by a method most suitable for the registered type.

The measuring instruments 131 to 133 connected to the communication circuit network 14, which are connected to the personal computer 11 through the interface unit 12, determine whether a load information request from the personal computer 11 is addressed to any of the measuring instruments 131 to 133, and only in the case where the request is so addressed, transmits the load information to the communication network 14 as a response. The load information thus transmitted is transmitted to the personal computer 11 through the interface unit 12, and the personal computer 11 determines whether the response is from the address to which the load information is requested. In the case where the load information is from such an address, the particular load information is stored as data associated with a predetermined time.

Next, the method of acquiring the load information from the measuring instruments 134, 135 connected to the communication circuit network 15 is explained.

The communication circuit network 15 is separated by the display device 1 according to the invention. The connection is registered on the personal computer 11, however, in the same manner as the devices connected to the communication circuit network 14.

The personal computer 11 requests the load information also from the measuring instruments 134, 135 connected to the communication circuit network 15 in the same manner as from the devices connected to the communication circuit network 14. Assuming that the personal computer 11 requests the load information from the measuring instrument 14, for example, this request can be received only by the devices connected to the communication circuit network 14. Nevertheless, the display device 1 according to the invention which functions as a parent unit of the communication circuit network 15 acts as an interface.

As described above, the display device 1 according to the invention recognizes the addresses, types and the number of connections of the devices connected to the communication circuit network 15 capable of displaying the load information on the display device 1. Specifically, the measuring instrument 134, which recognizes the connection to the communication circuit network 15, receives the request for the load information to the measuring instrument 134 from the personal computer 11 and transmits it to the communication circuit network 15. The measuring instrument 134 determines that the request of the personal computer transmitted to the communication circuit network 15 is addressed to the measuring instrument 134, and transmits the requested information to the communication circuit network 15. The display device 1, determining that the information thus transmitted is a response to the request to the measuring instrument 134, receives the response and stores it in the RAM therein.

Next, the load information of the measuring instrument 134 stored in the RAM is transmitted to the communication circuit network 14 with the address of the measuring instrument 134 in the same manner as if the response is from the measuring instrument 134. The personal computer 11 determines that the load information of the measuring instrument 134 thus transmitted is a response to the request to the measuring instrument 134, and records it in the personal computer 11 as a data associated with a predetermined time. This is also the case with the measuring instruments 135, 136 connected to the communication circuit network 15, and the display device 1 transmits the load information from the communication circuit network 14 to the communication circuit network 15. In this way, the collection of the load information is made possible between different communication circuit networks.

Figure 3A:
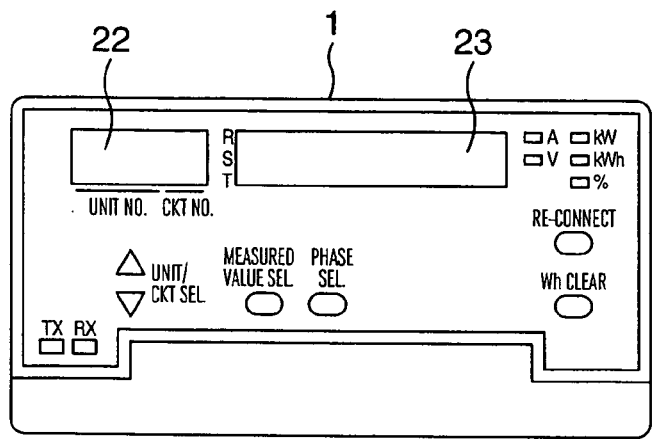
FIGS. 3A and 3B show the appearance of a display device according to the invention.
Figure 3B:
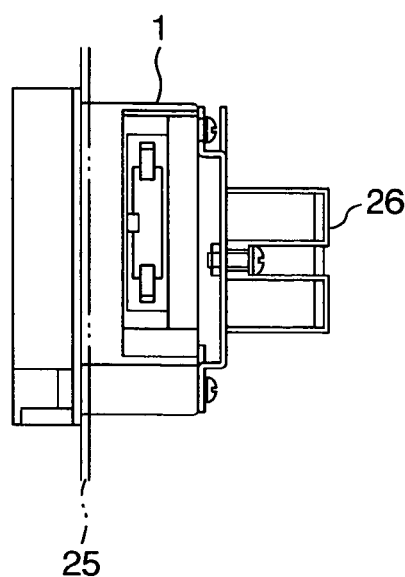

FIGS. 3A, 3B specifically show an appearance of the load information display device 1. FIG. 3A is a front view of the display panel, and FIG. 3B a side view. The display panel of the load information display device 1 includes a display unit 22 for displaying the unit number such as the measuring instruments 134, 135 and so on, and a display unit 23 for displaying the numerical value of the current, voltage, power, wattage or power factor. The display panel also includes a select button for switching the unit number. In FIG. 3B, numeral 25 with a two-dot chain designates a mounting surface on the board, and numeral 26 a terminal.

[Embodiment 2]

Figure 4:
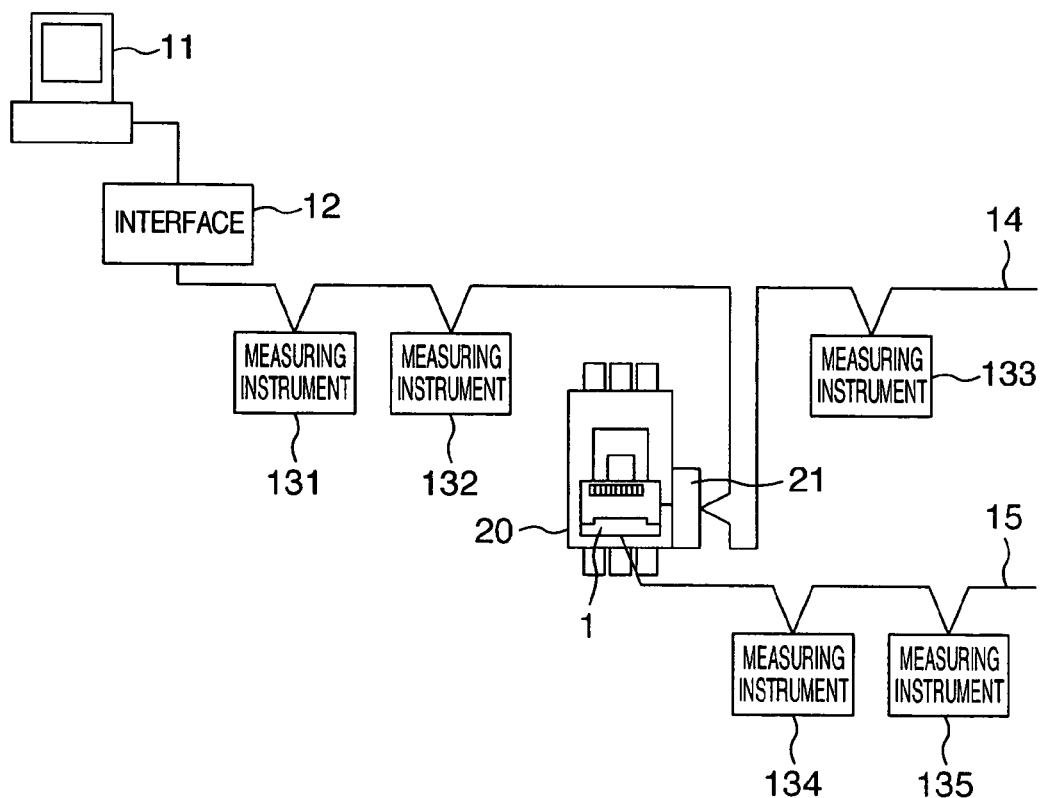
FIG. 4 is a system diagram according to a second embodiment.

FIG. 4 shows a system according to a second embodiment of the invention.

In the system according to the second embodiment, the load information display device 1 of the system according to the first embodiment shown in FIG. 2 is connected to a circuit breaker having the function of measuring and transmitting the load information.

The circuit breaker has a detector such as CT or VT. The detection signal is measured by a measurement communication unit 21 connected to the circuit breaker, and the measurement communication unit 21 calculates the current, voltage, wattage and the power factor. The result of calculation is transmitted to and displayed on the load information display device 1.

The load information display device 1 according to the second embodiment, like the display device according to the first embodiment, is connected to the measuring instruments 134, 135 and so on, and can also display the load information thereof.

FIGS. 5A, 5B show the appearance of the measurement communication unit and the load information display device arranged on the circuit breaker. In FIGS. 5A, 5B, the measurement communication unit 21 is arranged adjacently to the circuit breaker 20, and the load information display device 1 is arranged on the side of the load terminal above the circuit breaker to make a compact system. The problem of noises, etc. can be obviated by integrating the devices with the circuit breaker in this way.

It should be further understood by those skilled in the art that although the foregoing description has been made on embodiments of the invention, the invention is not limited thereto and various changes and modifications may be made without departing from the spirit of the invention and the scope of the appended claims.

The invention claimed is:

1. A load information display device connected with a plurality of measuring instruments to measure the load information including the current, voltage, power, wattage and power factor of an electrical circuit, comprising:

recording means for recording the load information measured by said measuring instruments;

display means for displaying said recorded load information;

selecting means for selecting the items displayed on said display means; and two types of digital signal communication means connectable with a plurality of devices;

wherein one type of digital signal communication means is connected to a central processing unit to use said one type of said digital signal communication means as communication means for recoding and centrally managing the load information measured by said measuring instruments in said central processing unit;

wherein another type of digital signal communication means is connected to at least one of said measuring instruments to use said another type of digital signal communication means as communication means for acquiring the load information measured by said at least one of measuring instrument;

wherein said two types of digital signal communication means are separated by said display means;

wherein a communication protocol to acquire the load information measured by said plurality of measuring instruments and a communication protocol to transmit the load information measured by said plurality of the measuring instruments to the central processing unit for recording and centrally managing the load information are shared with each other; and wherein said displaying means receives a request for the load information to be recorded and centrally managed in said central processing unit from said central processing unit, makes said request for the load information to said at least one of said measuring instruments connected to said another type of digital signal communication means, and transmits the information acquired from said at least one of said measuring instruments to the central processing unit.

2. A load information display device according to claim 1, wherein unique addresses, types and a number of the measuring instruments for measuring the load information at the time of switching on power are automatically recognized.

3. A load information display device according to claim 2, wherein the load information measured by a plurality of measuring instruments can be displayed by being switched by an operation unit.

4. A circuit breaker having the functions of measuring, displaying and transmitting the load information, comprising:
   a contact unit for opening and closing a main circuit;
   an open/close mechanism for opening and closing said contact unit;
   a means for detecting the current flowing in each phase;
   a means for detecting the voltage between lines;
   a control unit for controlling the opening of said contact point based on the current value detected by said current detection means and calculating the load information of the circuit based on the information acquired from said current detection means and said voltage detection means;
   a means for transmitting the calculated load information to other devices; and
   a plurality of load information display devices according to claim 2;
   wherein the plurality of load Information display devices are connected to each other through the digital signal communication means.

5. A load information display device according to claim 1, wherein the load information measured by a plurality of measuring instruments can be displayed by being switched by an operation unit.

6. A circuit breaker having the functions of measuring, displaying and transmitting the load information, comprising:
   a contact unit for opening and closing a main circuit;
   an open/close mechanism for opening and closing said contact unit;
   a means for detecting the current flowing in each phase;
   a means for detecting the voltage between lines;
   a control unit for controlling the opening of said contact point based on the current value detected by said current detection means and calculating the load information of the circuit based on the information acquired from said current detection means and said voltage detection means;
   a means for transmitting the calculated load information to other devices; and
   a plurality of load information display devices according to claim 3;
   wherein the plurality of load information display devices are connected to each other through the digital signal communication means.

7. A circuit breaker having the functions of measuring, displaying and transmitting the load information, comprising:
   a contact unit for opening and closing a main circuit;
   an open/close mechanism for opening and closing said contact unit;
   a means for detecting the current flowing in each phase;
   a means for detecting the voltage between lines;
   a control unit for controlling the opening of said contact point based on the current value detected by said current detection means and calculating the load information of the circuit based on the information acquired from said current detection means and said voltage detection means;
   a means for transmitting the calculated load information to other devices; and
   a plurality of load information display devices according to claim 1;
   wherein the plurality of load information display devices are connected to each other through the digital signal communication means.

* * * * *